Dec. 11, 1956

M. STENGER 2,773,576

FRICTION CLUTCH

Filed Aug. 12, 1952

INVENTOR
MAXIMILIEN STENGER

BY *Robert E. Burns*

ATTORNEY

Dec. 11, 1956 M. STENGER 2,773,576
FRICTION CLUTCH
Filed Aug. 12, 1952 4 Sheets-Sheet 2

INVENTOR
MAXIMILIEN STENGER
BY Robert E Burns
ATTORNEY

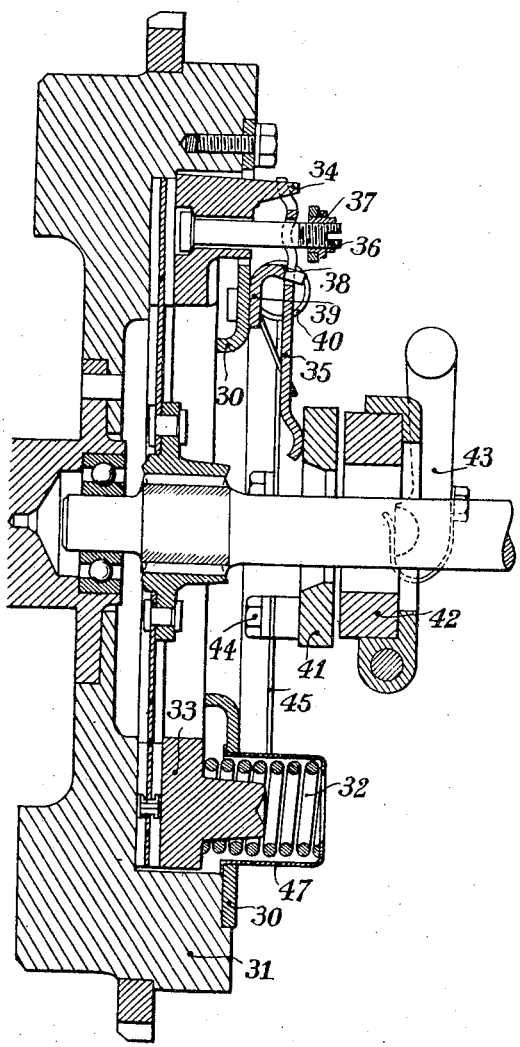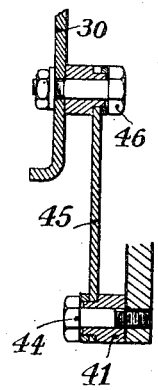

Dec. 11, 1956   M. STENGER   2,773,576
FRICTION CLUTCH
Filed Aug. 12, 1952   4 Sheets-Sheet 4

INVENTOR
MAXIMILIEN STENGER
BY Robert E. Burns
ATTORNEY

United States Patent Office 2,773,576
Patented Dec. 11, 1956

2,773,576

FRICTION CLUTCH

Maximilien Stenger, Paris, France, assignor to Societe Anonyme Française du Ferodo, Paris, France Application August 12, 1952, Serial No. 303,930

Claims priority, application France December 6, 1951

1 Claim. (Cl. 192—68)

My invention relates generally to friction clutches and more particularly to such clutches as are used on automobiles. Heretofore, the levers pivoted on the flywheel and adapted, consequent to their being rocked simultaneously to throw the clutch into or out of gear by moving a disc or the flywheel away from or towards one another, were actuated by an annular member slidably mounted on the clutch shaft and shifted with the aid of a fork. Said annular member may be a thrust ball bearing adapted by direct pressure to rock the same, instead of which it may be a graphite-lined member adapted to engage a clutch-disengaging ring by means of steel wire clamps. In either case the levers are subjected not only to the rocking action exerted thereon but also to transversal forces due to their rotation relative to the slidable member. The consequence is a wear of the lever system and the production of noise ascribable to undesired friction.

According to my invention, the aforesaid inconveniences are eliminated whereby no objectionable action is exerted any longer upon the levers by the fork-actuated slidable ring member.

The present invention has for its object a friction clutch operated through the medium of a fork and a slidable member in which the disengagement is obtained by the rocking of levers pivoted to a flywheel cover, said levers adapted to move a compressing disc partaking of the rotation of said flywheel away of the latter, said clutch being characterized in that the levers are rocked by the thrust of a ring which encircles the shaft and which is secured to said cover through transversal leaves by which said ring is pressed yieldingly against said levers, said leaves being stressed tensionally, whereby the transversal forces which will occur upon the slidable actuating member coming into engagement with said ring and exerting transversal friction forces thereon in addition to the thrust assigned to the levers are offset.

Preferably, the ring and the slidable actuating member engage one another on friction surfaces.

In a first embodiment of my clutch the ring consists of a centrally perforated sheet steel disc provided with a friction lining while the slidable actuating member is provided with a friction member mounted on a ball bearing.

In a second embodiment the ring is made of cast iron and the slidable actuating member is a graphite-lined sleeve.

Further features of the invention will become apparent from the description which will be made hereinafter for the purpose of exemplification and by no means of limitation of two preferred embodiments of my new clutch, reference being had to the appended sheets of drawings in which:

Figure 4 is a sectional view taken on the axis of a second embodiment of the clutch.

Figure 6 is a cross-sectional view taken on line VI—VI in Fig. 5.

Figure 1:
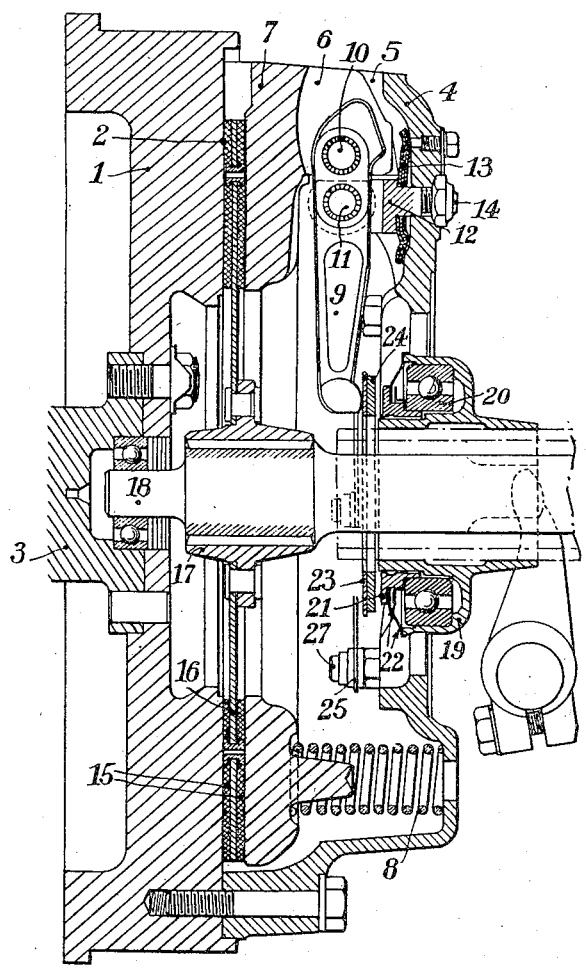
Figure 1 is a sectional view taken on the axis of a first embodiment of my clutch.
Figure 3:
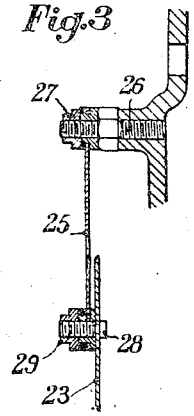
Figure 3 is a sectional view taken on line III—III in Fig. 2.
Figure 2:
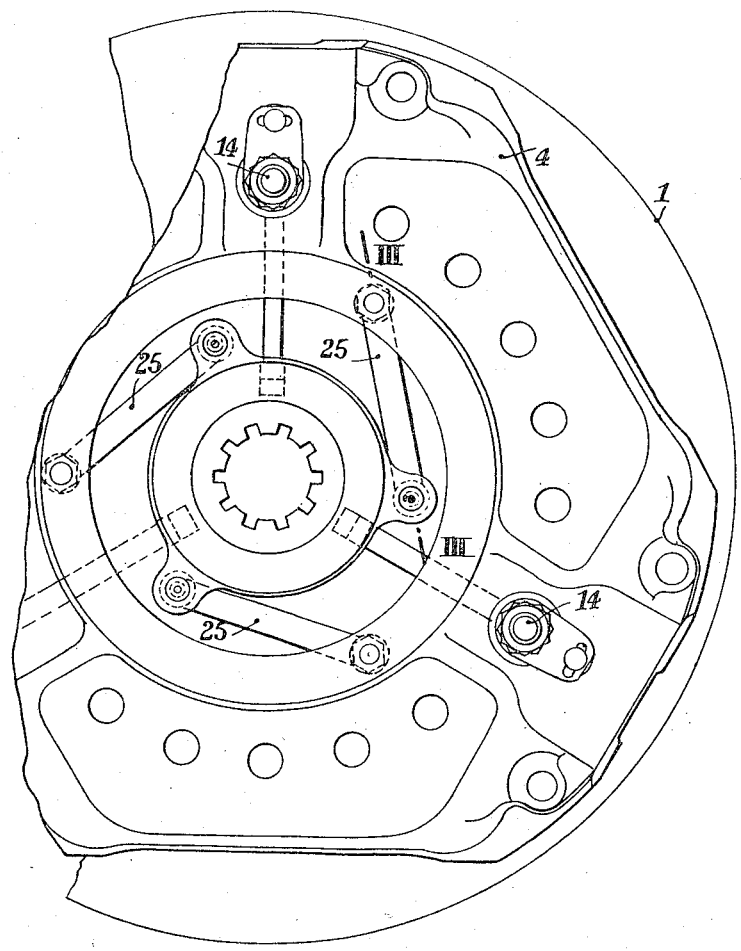
Figure 2 is an end view of the same taken from the right side of Fig. 1.

In the first embodiment which is shown in Figs. 1 to 3 my clutch comprises a flywheel 1 provided with a friction surface 2 and secured to the engine crankshaft 3. A cover 4 screw to flywheel 1 is provided with pressure faces 5 adapted through the lugs 6 to drive the pressure disc 7 of the clutch. Although being thus positively driven by flywheel 1 said disc 7 is nevertheless movable longitudinally relative thereto. Disc 7 is urged towards flywheel 1 by a set of springs 8 arranged between said disc 7 and the cover 4 of said flywheel 1. The clutch is thrown out of gear by means of a set of levers 9 pivoted at 10 to the lugs 6 on pressure disc 7 and at 11 in forks 12 assembled by ball-and-socket joints with the cover 4. The forks 12 are held in position by leaf-springs once said position has been set with the aid of spherical nuts 14.

Friction linings 15 riveted to a disc 16 provide for the driving of a fluted member 17 mounted for sliding motion on the primary shaft 18 of the gear box. An uncoupling sleeve 19 is slidably mounted through the medium of a ball bearing 20. Rigid with the inner race of said ball bearing is a friction cheek 21; the bearing is made oil- and dust-tight by means of deflectors 22.

The whole structure described hereinbefore is conventional and has only been described for the understanding of the arrangement of parts which is proper to the present invention.

A metal ring 23 rigid with a friction ring 24 is connected to the cover 4 of the flywheel 1 coaxial with the clutch shaft by means of thin spring leaves 25. Said leaves are arranged transversally, by which is meant that they are located in a plane at right angles to the clutch shaft yet do not intersect the latter. Said spring leaves are secured to the cover by means of studs 26 and nuts 27 and to the ring 23 by means of bolts 28 and nuts 29. Three such spring leaves are provided. As a result of the transversal arrangement of the spring leaves, same are stressed tensionally whenever the ring 23 is subjected to a torque consequent to the friction of cheek 21 on ring 24. On the other hand, said leaves permanently urge ring 23 into engagement with the clutch levers 12, and they are so resilient that they will partake unstressed of the displacements of said levers.

The operation of the device is as follows:

When it is desired to throw the clutch out of gear, for which purpose the actuating fork is actuated to move the slidable member towards the levers 9, the friction cheek 21 of said members will engage the friction ring 24 of ring 23. Said cheek 21 is driven into rotation progressively on its ball bearing 20 and the braking torque exerted by said cheek 21 upon the ring 23 during the period of acceleration of said cheek tends to slow down the rotational speed of said ring and the flywheel rigid therewith; this decelerating force is transmitted to and absorbed by the leaves 25, with the result that only longitudinal forces exclusive of objectionable transversal forces are transmitted by ring 23 to levers 9. As the cheek 21 reaches the rotational speed of the clutch it will no longer exert any torque on ring 23, with the result that the longitudinal force exerted by the cheek 21 upon the lining 24 of ring 23 is only effective to set up a longitudinal force by ring 23 upon the levers 9; in other words, the thrust of the slidable member is transmitted integrally by the ring 23 upon the levers 9.

The effect of the rocking of levers 9 is to move the disc 7 away from flywheel 1 against the action of the pressure members 8 and thereby to disengage members 1 and 7 from the linings 15 of disc 16, with the result that the primary shaft 18 ceases to be driven by the engine crankshaft 3.

Thus, for the whole duration of the release, no objectionable transversal force is transmitted to levers 12, and this, owing to the provision of ring 23 and of the transversal leaves 25 connecting the same to flywheel 1.

Figure 5:
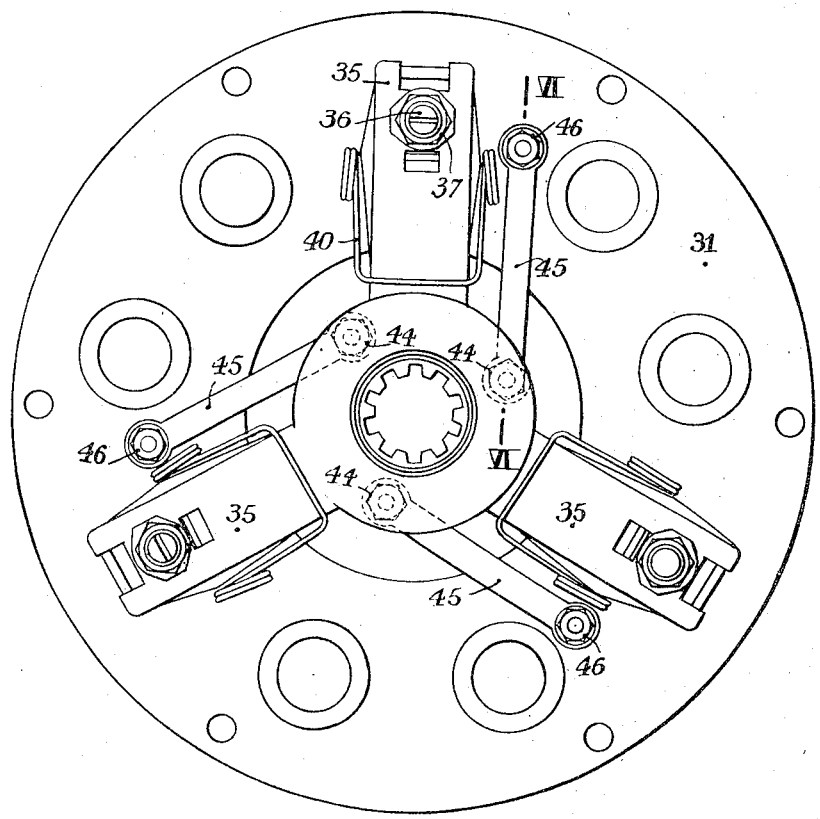
Figure 5 is an end elevational view of the same taken from the right side of Fig. 4.

In the second embodiment, which is shown in Figs. 4 to 6, the clutch is made of sheet iron and includes a graphite coupling member similar to those used on automobiles.

The cover 30 is secured by means of a bolt to the clutch flywheel 31. The pressure is obtained with the aid of a number of springs 32 interposed between the pressure disc 33 and sockets 47 fitted on cover 30. The disc 33 is driven by means of lugs 34 projecting through apertures in cover 30. The clutch is disengaged with the aid of a set of three levers 35 connected with the pressure disc 33 by means of bolts 36 and nuts 37, the said levers being able to rock about the edges 38 on brackets 39 riveted to the cover 30 of flywheel 31. The levers 35 are held in engagement with their respective fulcrums by springs 40. A graphite-lined actuating sleeve 42 is connected with the operating fork 43.

According to the invention, the graphite-lined member 42 is pressed into engagement with a cast iron ring 41 which is connected with the cover 30 of flywheel 31 by means of resilient transversal leaves 45 which are secured to ring 41 by screws 44 and to cover 30 by screws 46.

The device operates as follows:

When it is desired to disengage the clutch and therefore the fork 43 is acted on to shift member 42 towards levers 35 said member 42 will come into engagement with ring 41 and exert a torque thereon consequent to the friction of the graphite lining with the cast iron ring, whereby said member 42 tends to decelerate ring 41 in its rotational movement which it accomplishes together with the flywheel 31 and cover 30; the decelerating action thus exerted by member 42 upon ring 41 in its turn will tensionally stress each leaf 45 by which ring 41 is connected with cover 30; this amounts to say that the transversal forces exerted by member 42 upon ring 41 are transmitted to and cushioned by leaves 45. It follows that only longitudinal forces are transmitted from ring 41 to levers 35 by which same are urged to rock, exclusive of transversal forces damageable to them.

It will thus be appreciated that in none of the aforedescribed embodiments is any objectionable action transmitted to the levers, and that wear and noise ascribable to such objectionable action are suppressed altogether. The life of the clutch is thereby lengthened materially.

What I claim is:

A friction clutch comprising a flywheel, a cover plate fastened thereto, a pressure plate located between said flywheel and said cover plate, a driven shaft, at least one friction plate located between said flywheel and said pressure plate and mounted for axial sliding motion on, and rotary motion with, said driven shaft, clutch springs of the coil compression type bearing with one end on the inner face of said cover plate and with the other end on said pressure plate to urge same against said flywheel and press said friction plate or plates between said pressure plate and said flywheel, clutch release levers each mounted for rocking motion on a relevant intermediate oscillating member bearing on said cover plate, having an end portion pivoted on said presser plate to control the longitudinal movements thereof and another bearing end portion, a control member mounted for axial sliding motion on said driven shaft and adapted to move in the direction of said bearing end portions of said release levers for disengaging the clutch, a flat ring disposed between said bearing end portions of said clutch release levers and said control member, and rectilinear resilient blades extending in a plane close and parallel to said flat ring, and having one end pivotally mounted on said flat ring and the other end secured to said cover plate so as to extend also tangentially to the flat ring contour in the direction of movement of the assembly, said resilient blades being adapted resiliently to urge said flat ring for engagement with said bearing end portions of said clutch release levers and drivingly connecting said flat ring with said cover plate for rotation therewith.

References Cited in the file of this patent

UNITED STATES PATENTS

| | | |
|---|---|---|
| 1,790,284 | Reed | Jan. 27, 1931 |
| 2,407,728 | Spase | Sept. 17, 1946 |

FOREIGN PATENTS

| | | |
|---|---|---|
| 370,191 | Great Britain | Apr. 7, 1932 |
| 549,396 | Great Britain | Nov. 19, 1942 |